(No Model.)
S. A. MOULTON.
ROAD LEVELER.
No. 325,354. Patented Sept. 1, 1885.
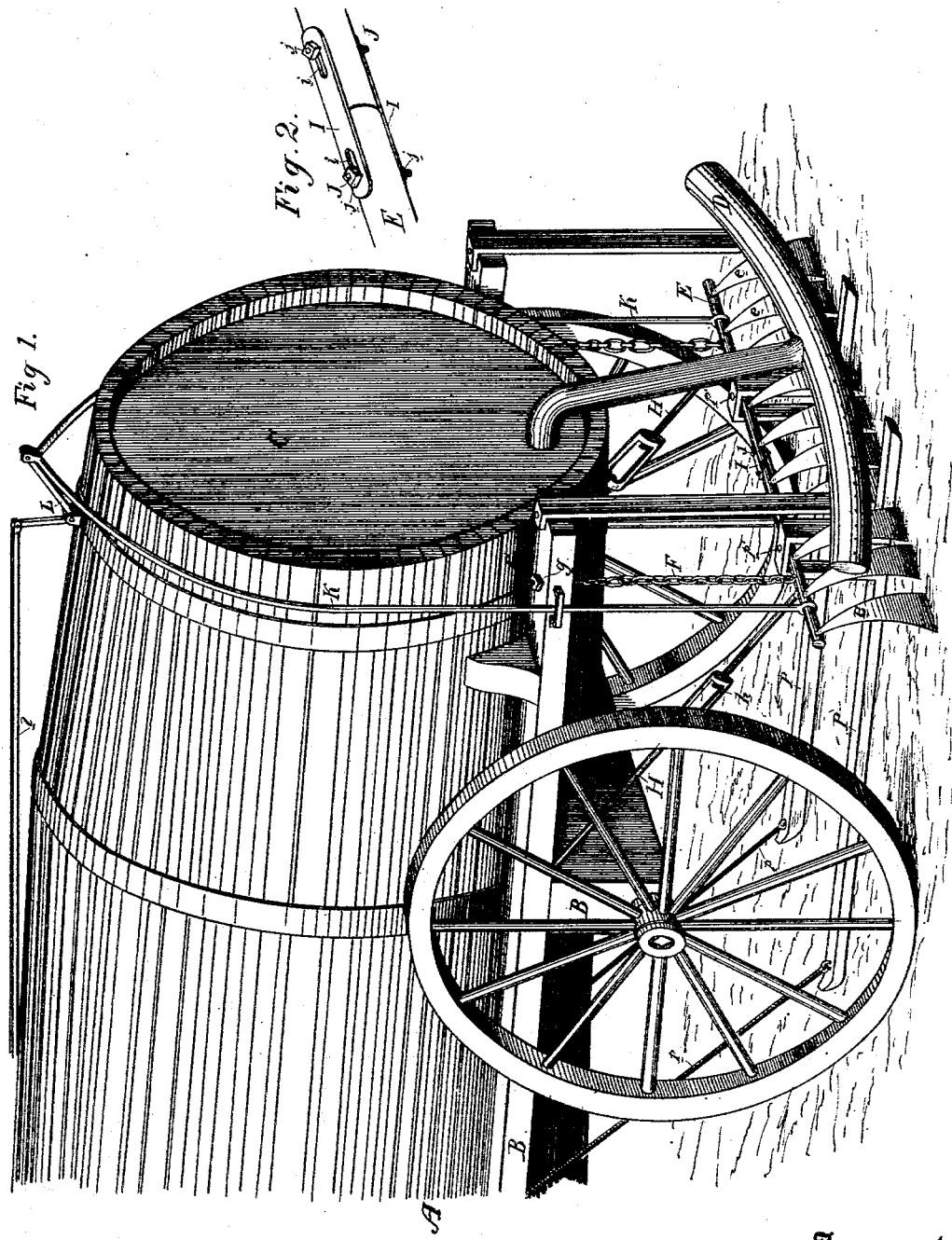
Witnesses
Geo. H. Strong.
J. H. Nourse.
Inventor
S. A. Moulton,
By Dewey & Co.
Attorneys

UNITED STATES PATENT OFFICE.

STILLMAN A. MOULTON, OF SAN JOSÉ, CALIFORNIA.

ROAD-LEVELER.

SPECIFICATION forming part of Letters Patent No. 325,354, dated September 1, 1885.

Application filed February 18, 1885. (No model.)

*To all whom it may concern:*

Be it known that I, STILLMAN A. MOULTON, of San José, county of Santa Clara, and State of California, have invented an Improvement in Road-Levelers; and I do hereby declare the following to be a full, clear, and exact description thereof.

My invention relates to a new and useful road-leveling device adapted to be attached to any wagon, cart, or other wheeled frame, but especially to watering or sprinkling carts.

My invention consists in a scraper-head carrying a series of spring teeth or scrapers and adjustably suspended from the wheeled frame either before or behind the wheels, said scraper-head being so constructed as to be enabled to bend at its middle to an angle in a horizontal or in a vertical plane.

It consists, further, in peculiar runners connected with the wheeled frame and with the scraper-head, and which may or may not be used, as required, and in details of construction relating to the various adjustments of the parts, all of which I shall hereinafter fully explain by reference to the accompanying drawings, in which—

Figure 1 is a perspective view of my leveler applied to a watering-cart. Fig. 2 is a detail showing the hinge connection of the sectional scraper-head.

The object of my invention is to provide a scraping attachment for any wagon or wheeled frame, which is adapted to level gradually little by little the small inequalities of the roadway, filling up the ruts and cutting away the ridges; and with this effect in view the particular object of my invention is to attach it to a watering or sprinkling cart, which, by reason of its incessant and localized traveling, is best adapted as the means by which the leveler is set in operation. Accordingly, I have herein illustrated my invention in connection with an ordinary watering-cart.

A is the cart, having the wheeled frame B, on which is mounted the reservoir C, which is connected suitably with the sprinkling-pipe D.

E is the scraper-head, consisting of a long bar, beam, or rod, preferably a pipe, for the sake of lightness and strength. This is suspended from the rear end of the wheeled frame by chains F, which are adapted to vertically adjust the scraper-head by means of nuts *g* on spindles or hangers G, seated in the sills of the frame and attached to the chains.

To the scraper-head are solidly attached the rods H, the other ends of which are secured under the sills of the frame, and are provided with turn-buckles *h*, whereby the scraper-head may be adjusted farther forward or back.

By means of the adjustable chains F and the adjustable rods H the scraper-head may be suspended at any desired distance from the ground and from the wheels of the frame.

Secured to the head E are the spring scrapers or teeth *e*, which curve over the rear of the head and project toward, though not touching, the ground.

The operation as far as described is as follows: When the wheels travel over a level surface, the scraper-teeth do not come in contact with the ground; but if there are any little ridges in the road they are leveled off by the teeth; or when the wheels or either of them drop into a rut or depression, the teeth coming in contact with the road just behind, scrape up a little of the earth and deposit it in the rut. Thus by continually moving over the road, as a watering-cart does, the gradual action of the leveler will in time begin to show, and the road will be kept in perfect order, free from ridges and ruts.

The scraper-head is made in two or more parts, (here shown as two,) placed in line and meeting at the center, though not closely enough to prevent the hinge action, which I shall now describe.

I are connecting strips or links above and below the head and crossing the meeting line of the parts thereof. These are provided on each end with slots *i*, through which and through the head pass bolts J, which pivot them to the parts of said head. The bolts are provided with nuts *j*, whereby they are adapted to be set up or tightened to hold the head. By these means the head may be bent at its center to an angle in a horizontal plane, either with its center forward or back, or it may, by sufficiently loosening the bolts, be bent to an upward angle in a vertical plane. The object of the former movement is to throw the scrapings outwardly to each side or toward the center, and the object of the latter movement is to enable the scrapers to area the road.

In order to raise the scraper-head entirely clear when not in use, or when a raised car-track or other obstruction is met, I have the bail K secured to it, and passing up on each side of and suitably guided by the wheeled frame. At its upper end it is attached to one arm of a pivoted elbow-lever, L, to the other arm of which is attached a rod, $l$, by which it is operated.

In some cases it may be desirable to control the movements of the scraper-head, and not allow it to depend entirely on the wheels for its operation. To do this I have the long side runners or guides, P. These are connected by chains $p$ with the front of the frame, and extend over and to the rear of the scraper-head. Where they pass over it they are secured by bolts $p'$. They travel on the ground, and the teeth, by terminating short of the ground, are enabled to take the high places with certainty and level off evenly over a greater space; or the teeth may be bent down below the runners, and thus level the road more completely.

Having thus described my invention, what I claim as new, and desire to secure by Letters Patent, is—

1. In a road-leveler, a wheeled frame, in combination with the adjustable and jointed scraper-head E, suspended from the frame and provided with a series of spring scrapers or teeth, $e$, terminating above the horizontal plane of the lowest points of the wheels, substantially as and for the purpose herein described.

2. In a road-leveler, a wheeled frame, in combination with the scraper-head E, suspended from the frame and adapted to be adjusted to various distances above the ground and from the wheels, and the spring scrapers or teeth $e$ on the scraper-head, substantially as and for the purpose herein described.

3. In a road-leveler, the wheeled frame B, in combination with the scraper-head E, having teeth $e$, as described, and the means by which said scraper-head is suspended and adjusted, consisting of the vertically-adjustable chains F, and the extensible or adjustable diagonal rods H, secured to the frame, substantially as and for the purpose herein described.

4. In a road-leveler, the suspended transverse sectional and hinged scraper-head E, having scrapers or teeth $e$, said scraper-head being adapted to be bent at the meeting lines of its hinged sections to an angle in horizontal or in a vertical plane, and the series of spring scrapers or teeth $e$ carried by said head, substantially as and for the purpose herein described.

5. In a road-leveler, the suspended sectional scraper-head E, having the scrapers or teeth $e$, in combination with the slotted hinge-links I joining the sections of the scraper-head, and the bolts J and nuts $j$, by which they are fixed, substantially as and for the purpose herein described.

6. The watering-cart A, having wheeled frame B, and sprinkler D, in combination with the sectional hinged scraper-head E, having spring scrapers or teeth $e$, the adjustable chains F and rods H by which the scraper-head is suspended from the frame and adjusted, and the bail K, pivoted elbow-lever L, and rod $l$ by which it is raised out of the way, substantially as and for the purpose herein described.

7. The wheeled frame B, and the transverse scraper-head E, suspended from the frame and having the spring scrapers or teeth $e$, adapted to operate as described, in combination with the side runners or guides, P, connected with the frame in front and extending to the rear of and secured to the scraper-head, substantially as and for the purpose herein described.

In witness whereof I have hereunto set my hand.

STILLMAN A. MOULTON.

Witnesses:
M. J. ASHMORE,
H. M. BRIGGS.